United States Patent
Chin et al.

(10) Patent No.: US 8,693,408 B2
(45) Date of Patent: Apr. 8, 2014

(54) METHODS AND SYSTEMS FOR SUBSCRIBER STATION-BASED ADMISSION CONTROL

(75) Inventors: Tom Chin, San Diego, CA (US);
Kuo-Chun Lee, San Diego, CA (US);
Carl Guangming Shi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 851 days.

(21) Appl. No.: 12/131,912

(22) Filed: Jun. 2, 2008

(65) Prior Publication Data

US 2009/0197611 A1    Aug. 6, 2009

Related U.S. Application Data

(60) Provisional application No. 61/025,663, filed on Feb. 1, 2008.

(51) Int. Cl.
*H04W 4/00* (2009.01)

(52) U.S. Cl.
USPC ........... 370/329; 370/230; 370/328; 370/437; 370/468

(58) Field of Classification Search
None
See application file for complete search history.

(56) References Cited

U.S. PATENT DOCUMENTS

| | | | |
|---|---|---|---|
| 6,466,795 B1 | 10/2002 | Ahn | |
| 6,738,625 B1 | 5/2004 | Oom et al. | |
| 7,072,663 B2 | 7/2006 | Ramos et al. | |
| 7,269,423 B2 | 9/2007 | Lee et al. | |
| 7,933,557 B1 * | 4/2011 | Townley et al. | 455/67.11 |
| 2005/0009515 A1 | 1/2005 | Inoko | |
| 2006/0002336 A1 * | 1/2006 | Stanwood et al. | 370/328 |
| 2007/0019599 A1 | 1/2007 | Park et al. | |
| 2007/0086379 A1 | 4/2007 | Takayanagi et al. | |
| 2007/0259692 A1 * | 11/2007 | Venkatachalam | 455/560 |
| 2007/0298808 A1 * | 12/2007 | Pan et al. | 455/452.1 |
| 2009/0059857 A1 * | 3/2009 | Kim et al. | 370/329 |

FOREIGN PATENT DOCUMENTS

| | | | |
|---|---|---|---|
| CN | 1356012 A | | 6/2002 |
| CN | 1949899 A | | 4/2007 |
| CN | 1949899 A | | 4/2007 |
| EP | 0915592 A1 | | 5/1999 |
| EP | 1220561 A2 | | 7/2002 |
| EP | 1761080 A1 | | 3/2007 |
| JP | 2000078653 A | | 3/2000 |

(Continued)

OTHER PUBLICATIONS

Gao Xia, Wu Gang: "On terminal-based resource reservation coordination" IEEE on Global Telecommunications Conference 2003 (GLOBECOM 2003), [Online] vol. 7, Dec. 1, 2003-Dec. 5, 2003, pp. 3787-3791, XP002526234 Retrieved from the Internet: URL:http://ieeexplore.ieee.org/stamp/stamp .jsp?arnumber=01258940> [retrieved on Apr. 30, 2009] the whole document.

(Continued)

*Primary Examiner* — Donald Mills

(57) ABSTRACT

A method for subscriber station-based admission control may include determining that there is demand for a new connection at the subscriber station. The method may also include determining whether the new connection should be admitted based on resource availability. The method may also include sending a request for the new connection to a base station if it is determined that the new connection should be admitted.

44 Claims, 13 Drawing Sheets

(56) References Cited

FOREIGN PATENT DOCUMENTS

| JP | 2000078653 A | 3/2000 |
| JP | 2003500954 A | 1/2003 |
| JP | 2005086816 A | 3/2005 |
| JP | 2007110363 A | 4/2007 |
| JP | 2007110363 A | 4/2007 |
| JP | 2008011178 A | 1/2008 |
| JP | 2008011178 A | 1/2008 |
| RU | 2222876 | 1/2004 |
| WO | 9826523 A2 | 6/1998 |
| WO | 0072626 A1 | 11/2000 |
| WO | 0232179 A1 | 4/2002 |

OTHER PUBLICATIONS

International Search Report and the Written Opinion—PCT/US2009/032685 International Search Authority—European Patent Office—Jun. 10, 2009, pp. 1-94.

IEEE Standard 802.16, IEEE Standard for Local and Metropolitan Area Networks, Part 16: Air Interface for Fixed Broadband Wireless Access Systems, pp. 1-895, Oct. 1, 2004.

Taiwan Search Report—TW098103261—TIPO—Dec. 15, 2013.

* cited by examiner

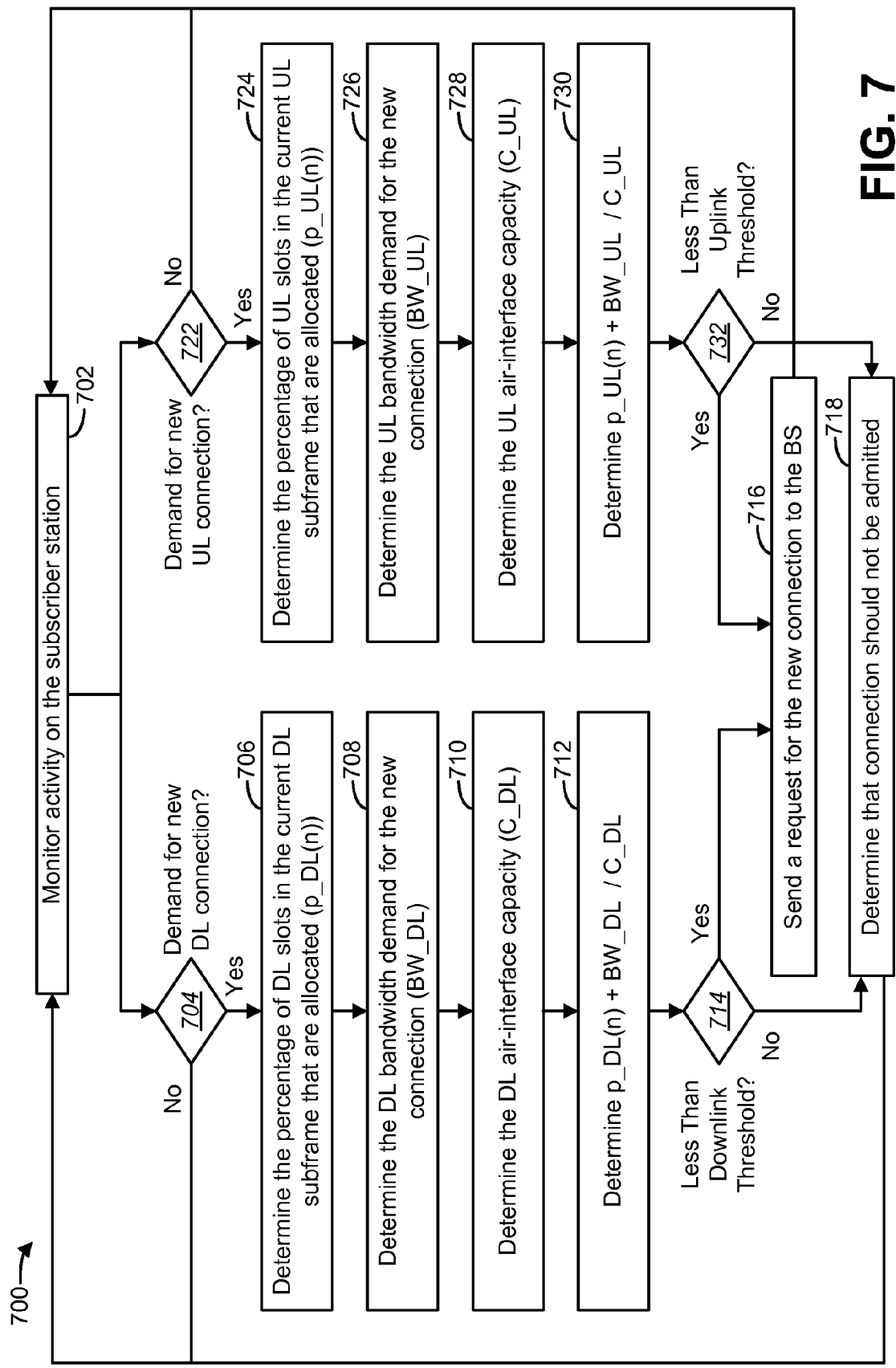

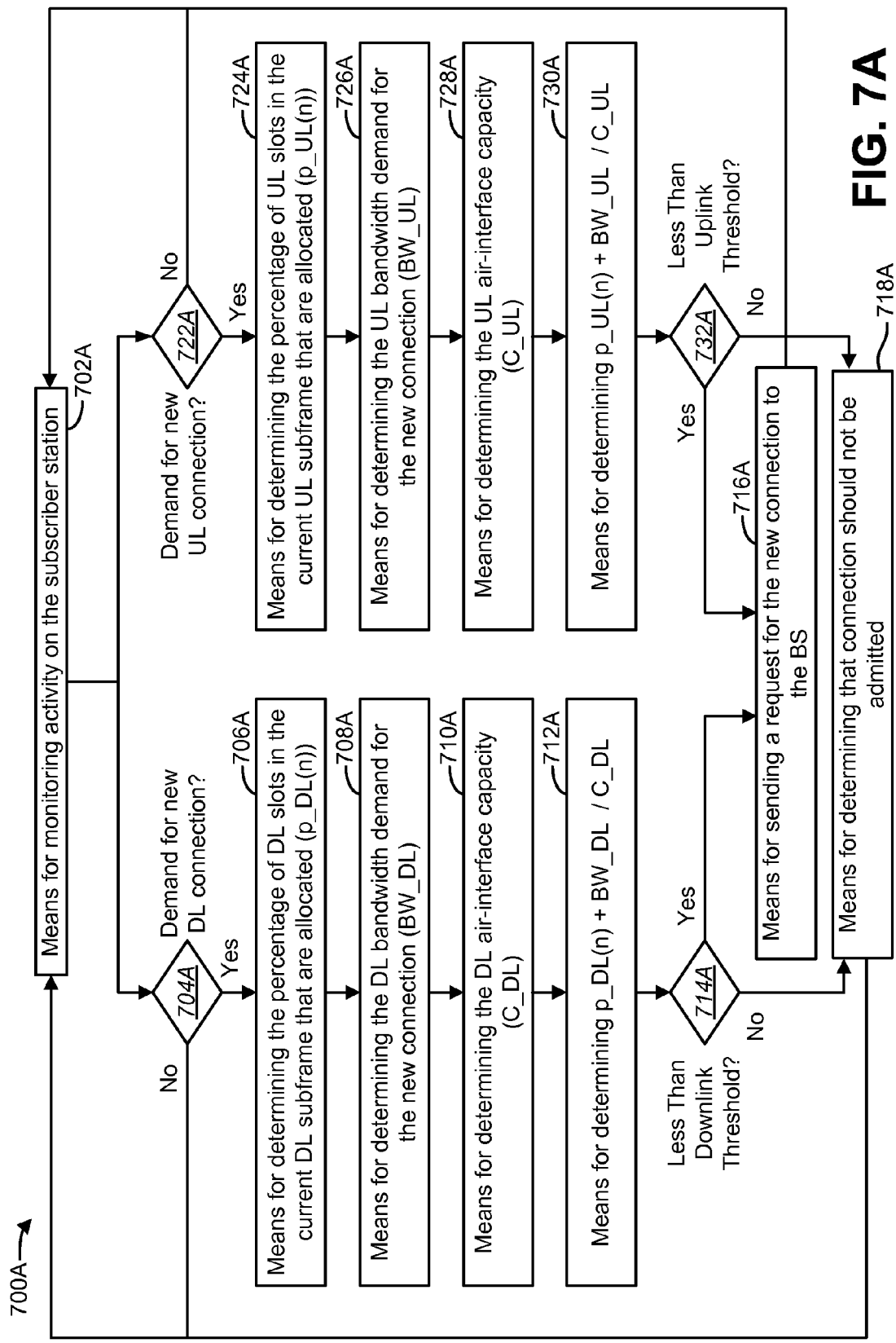

METHODS AND SYSTEMS FOR SUBSCRIBER STATION-BASED ADMISSION CONTROL

CLAIM OF PRIORITY

This application claims the benefit of priority from U.S. Provisional Patent Application Ser. No. 61/025,663, filed Feb. 1, 2008 and entitled "Mobile Terminal Based Admission Control in the WiMAX Radio Bandwidth Management," which is fully incorporated herein by reference for all purposes.

TECHNICAL FIELD

The present disclosure relates generally to wireless communication technology. More specifically, the present disclosure relates to methods and systems for subscriber station-based admission control.

BACKGROUND

As used herein, the term "subscriber station" refers to an electronic device that may be used for voice and/or data communication over a wireless communication network. Examples of subscriber stations include cellular phones, personal digital assistants (PDAs), handheld devices, wireless modems, laptop computers, personal computers, etc. A subscriber station may alternatively be referred to as a mobile station, a mobile terminal, an access terminal, a remote station, a user terminal, a terminal, a subscriber unit, user equipment, etc.

A wireless communication network may provide communication for a number of subscriber stations, each of which may be serviced by a base station. A base station may alternatively be referred to as an access point, a Node B, or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication network (e.g., bandwidth and transmit power) may be shared among multiple subscriber stations. A variety of multiple access techniques are known, including code division multiple access (CDMA), time division multiple access (TDMA), frequency division multiple access (FDMA), and orthogonal frequency division multiple access (OFDMA).

BRIEF DESCRIPTION OF THE DRAWINGS

FIG. 7 illustrates an alternative method for performing admission control with respect to new connections;

FIG. 7A illustrates means-plus-function blocks corresponding to the method of FIG. 7;

SUMMARY

Figure 1:
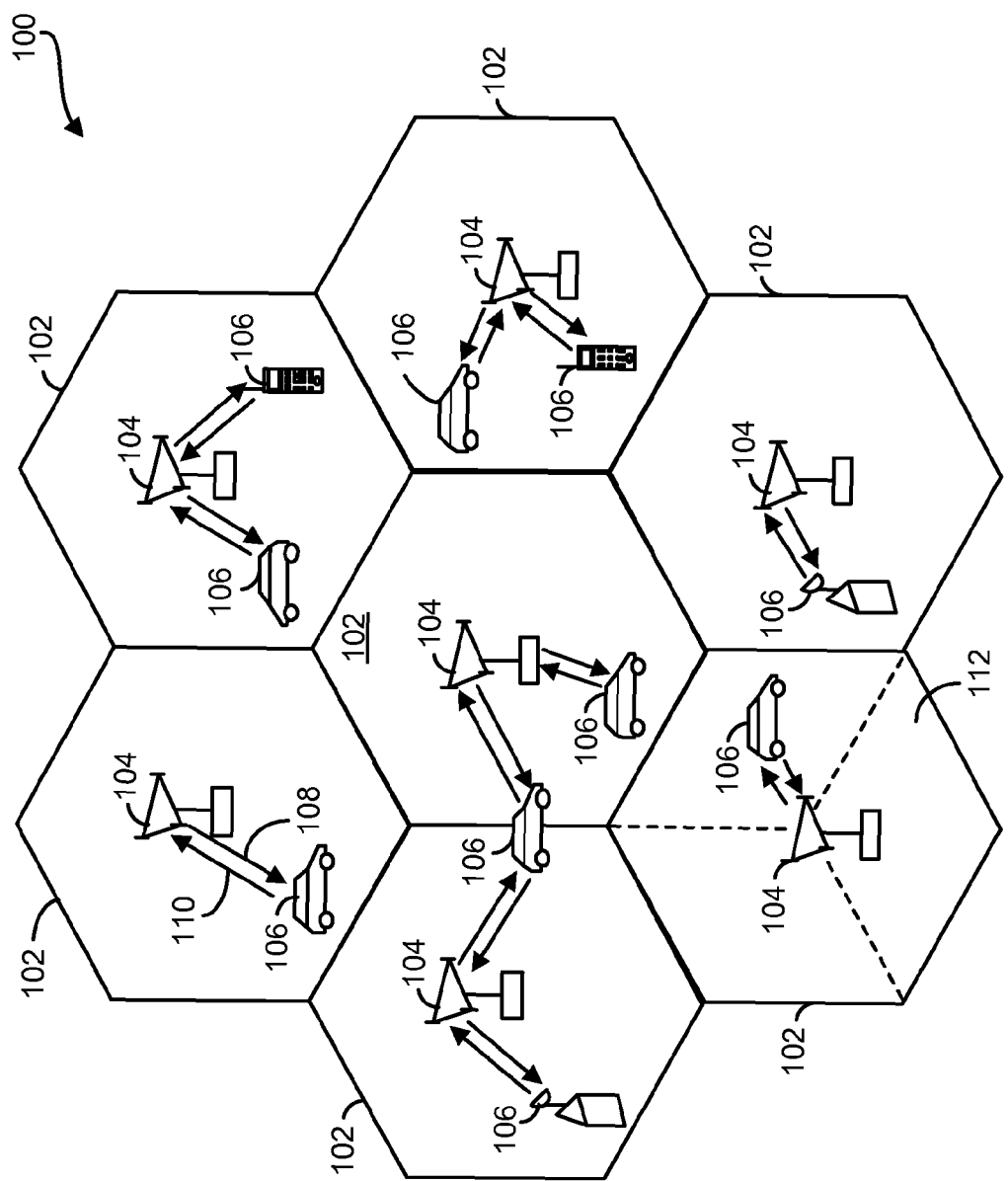
FIG. 1 illustrates an example of a wireless communication network.

A method for subscriber station-based admission control is disclosed. The method may include determining that there is demand for a new connection at the subscriber station. The method may also include determining whether the new connection should be admitted based on resource availability. The method may also include sending a request for the new connection if it is determined that the new connection should be admitted. The request may be sent, for example, to a base station. The subscriber station may be configured to communicate via a wireless communication network that supports an Institute of Electronic and Electrical Engineers (IEEE) 802.16 standard.

A subscriber station that is configured to implement admission control is also disclosed. The subscriber station includes a processor, memory in electronic communication with the processor, and instructions stored in the memory. The instructions may be executable by the processor to determine that there is demand for a new connection at the subscriber station. The instructions may also be executable by the processor to determine whether the new connection should be admitted based on resource availability. The instructions may also be executable by the processor to send a request for the new connection if it is determined that the new connection should be admitted. The request may be sent, for example, to a base station. The subscriber station may be configured to communicate via a wireless communication network that supports an Institute of Electronic and Electrical Engineers (IEEE) 802.16 standard.

A subscriber station that is configured to implement admission control is also disclosed. The subscriber station may include means for determining that there is demand for a new connection at the subscriber station. The subscriber station may also include means for determining whether the new connection should be admitted based on resource availability. The subscriber station may also include means for sending a request for the new connection if it is determined that the new connection should be admitted. The request may be sent, for example, to a base station. The subscriber station may be configured to communicate via a wireless communication network that supports an Institute of Electronic and Electrical Engineers (IEEE) 802.16 standard.

A computer-program product for implementing subscriber station-based admission control is also disclosed. The computer-program product comprises a computer-readable medium having instructions thereon. The instructions may include code for determining that there is demand for a new connection at the subscriber station. The instructions may also include code for determining whether the new connection should be admitted based on resource availability. The instructions may also include code for sending a request for the new connection if it is determined that the new connection should be admitted. The request may be sent, for example, to a base station. The subscriber station may be configured to communicate via a wireless communication network that supports an Institute of Electronic and Electrical Engineers (IEEE) 802.16 standard.

DETAILED DESCRIPTION

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances. Some of the examples described herein are relevant to wireless communication networks that are configured in accordance with WiMAX standards. However, these examples should not be interpreted as limiting the scope of the present disclosure.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

FIG. 1 illustrates a wireless communication network 100. The wireless communication network 100 provides communication for a number of cells 102, each of which is serviced by a base station 104. A base station 104 may be a fixed station that communicates with subscriber stations 106. The base station 104 may alternatively be referred to as an access point, a Node B, or some other terminology.

FIG. 1 shows various subscriber stations 106 dispersed throughout the network 100. The subscriber stations 106 may be fixed (i.e., stationary) or mobile. The subscriber stations 106 may alternatively be referred to as mobile stations, mobile terminals, access terminals, remote stations, user terminals, terminals, subscriber units, user equipment, etc. The subscriber stations 106 may be wireless devices, such as cellular phones, personal digital assistants (PDAs), handheld devices, wireless modems, laptop computers, personal computers, etc.

A variety of algorithms and methods may be used for transmissions in the wireless communication network 100 between the base stations 104 and the subscriber stations 106. For example, signals may be sent and received between the base stations 104 and the subscriber stations 106 in accordance with orthogonal frequency division multiple access (OFDMA), code division multiple access (CDMA), time division multiple access (TDMA), frequency division multiple access (FDMA), etc.

A communication link that facilitates transmission from a base station 104 to a subscriber station 106 may be referred to as a downlink 108, and a communication link that facilitates transmission from a subscriber station 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within the wireless communication network 100 may utilize antennas that concentrate the flow of power within a particular sector 112 of the cell 102.

Figure 2:
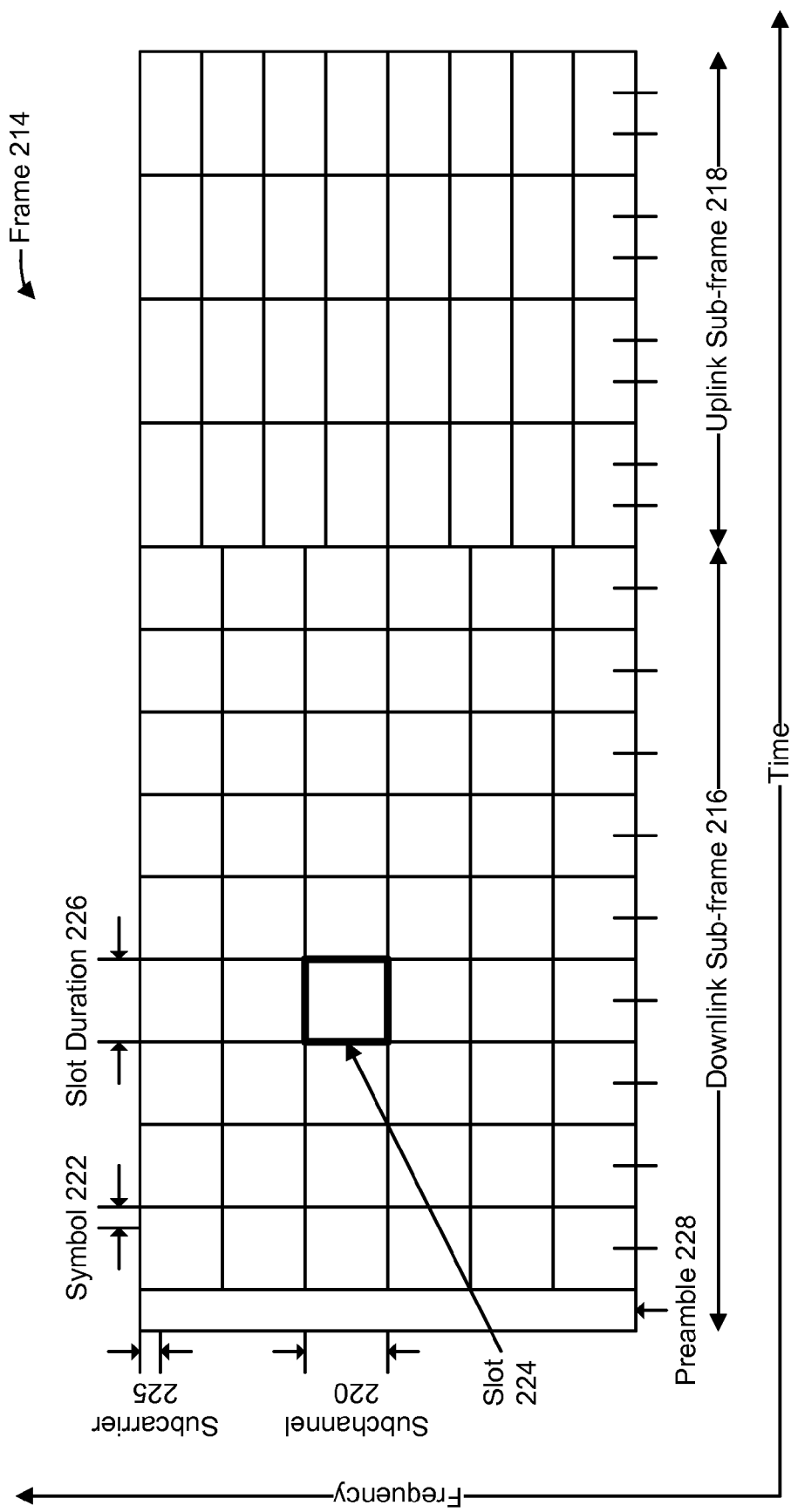
FIG. 2 illustrates an example showing certain aspects of the structure of a frame in a WiMAX network.

FIG. 2 illustrates an example showing certain aspects of the structure of a frame 214 in a WiMAX network. In a WiMAX network, a frame 214 is a time interval of constant length. For time division duplex (TDD) operation, each frame 214 is divided into a downlink (DL) sub-frame 216 and an uplink (UL) sub-frame 218. The downlink sub-frame 216 begins with a preamble 228.

In a WiMAX network, a slot 224 is the smallest unit to allocate bandwidth to users. A slot 224 is a subchannel 220 (i.e., a group of subcarriers 225) over a slot duration 226 (i.e., a certain number of symbols 222).

Figure 3:
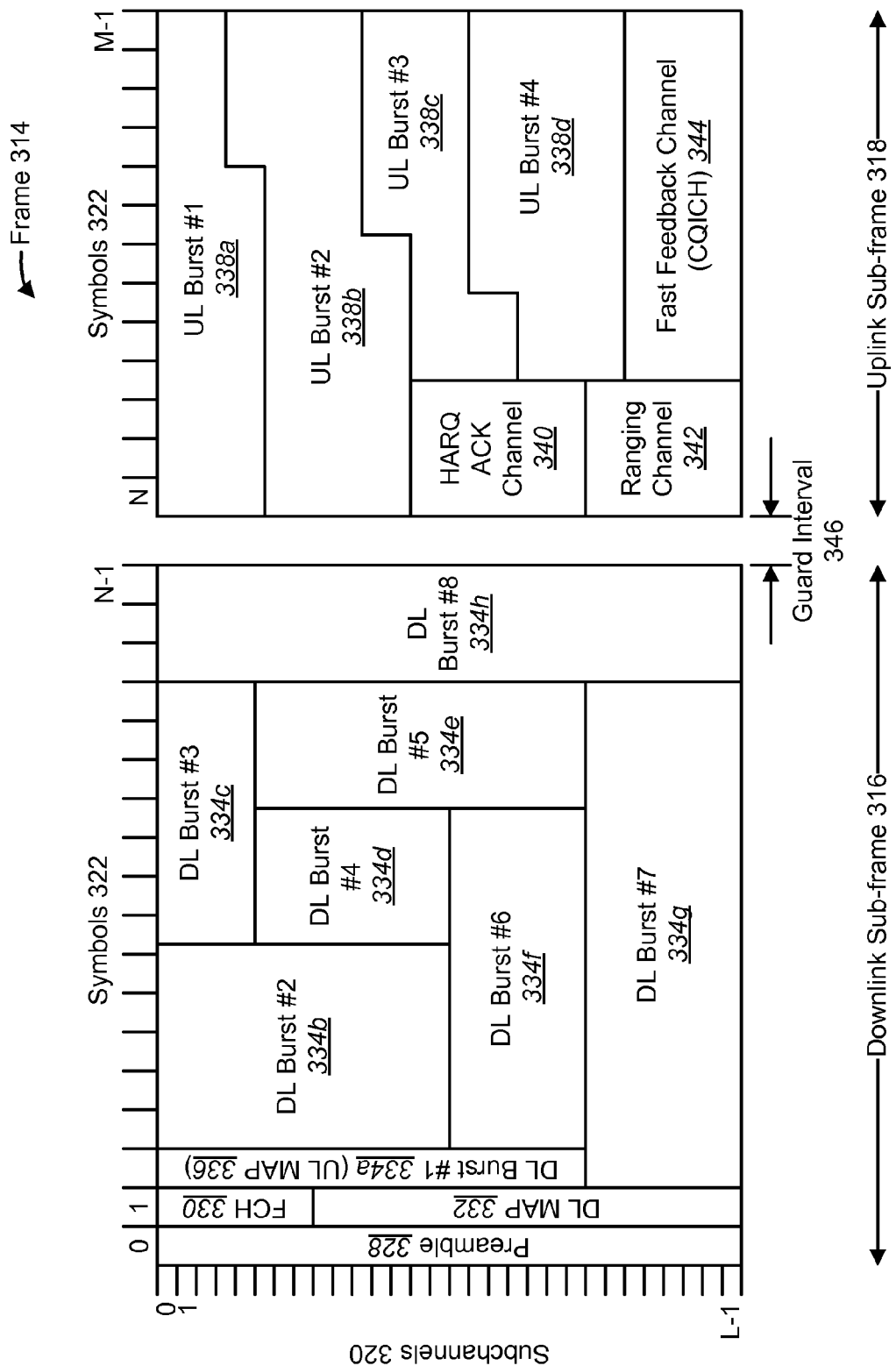
FIG. 3 illustrates an example showing certain additional aspects of the structure of a frame in a WiMAX network.

FIG. 3 illustrates an example showing certain additional aspects of the structure of a frame 314 in a WiMAX network. The frame 314 includes a downlink sub-frame 316 and an uplink sub-frame 318, separated by a guard interval 346. The frame 314 is transmitted over L subchannels 320. There are a total of M symbols 322 in the frame 314, N symbols 322 in the downlink sub-frame 316 and M-N symbols in the uplink sub-frame 318.

The downlink sub-frame 316 includes a preamble 328. The preamble 328 is used for physical layer procedures, such as time and frequency synchronization and initial channel estimation. The downlink sub-frame 316 also includes a frame control header (FCH) 330. The FCH 330 provides frame 314 configuration information, such as the MAP message length, the modulation and coding scheme, and the usable subcarriers 225.

Multiple users are allocated data regions within the frame 314, and these allocations are specified in the downlink MAP message 332 and the uplink MAP message 336. The MAP messages 332, 336 include the burst profile for each user, which defines the modulation and coding scheme that are used.

The downlink sub-frame 316 also includes multiple downlink bursts 334a-h. The first downlink burst 334a is typically the uplink MAP message 336. The downlink bursts 334a-h may be of varying size and type, and may carry data for several users.

The uplink sub-frame 318 includes multiple uplink bursts 338a-d, which may be from different users. The uplink sub-frame also includes a ranging channel 342, which may be used to perform closed-loop frequency, time, and power adjustments during network entry as well as periodically afterward. The ranging channel 342 may also be used by subscriber stations 106 to make uplink bandwidth requests.

The uplink sub-frame 318 also includes a channel-quality indicator channel (CQICH) 344 for the subscriber stations 106 to feed back channel-quality information that can be used by the scheduler at the base station 104. The CQICH 344 may also be referred to as a fast feedback channel 344. The uplink sub-frame 318 also includes a hybrid automatic repeat request (HARQ) acknowledgement (ACK) channel 340, which may be used by subscriber stations 106 to feed back downlink acknowledgements.

Figure 3A:
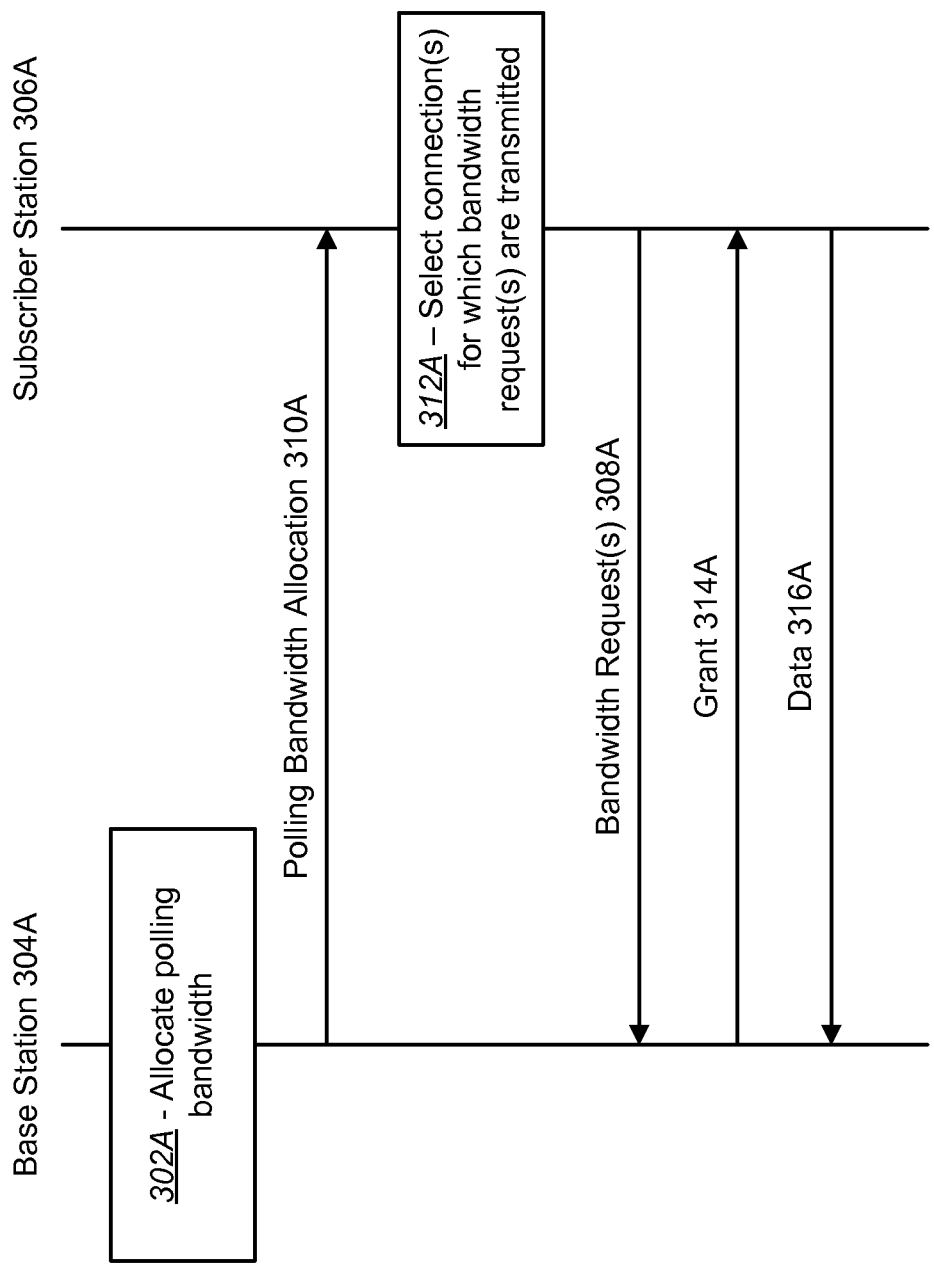
FIG. 3A illustrates examples of various functions that may be performed by a base station and a subscriber station, and examples of certain types of communication that may occur between a base station and a subscriber station.

FIG. 3A illustrates examples of various functions that may be performed by a base station 304A and a subscriber station 306A. FIG. 3A also illustrates examples of certain types of communication that may occur between the base station 304A and the subscriber station 306A.

The base station 304A may allocate 302A polling bandwidth to a subscriber station 306A. The polling bandwidth is the bandwidth that is used by the subscriber station 306A for sending bandwidth requests 308A to the base station 304A. The base station 304A may communicate the polling bandwidth allocation 310A to the subscriber station 306A. For example, the base station 304A may indicate the basic connection identifier (CID) of the subscriber station 306A in the UL-MAP 336.

The subscriber station 306A may select 312A one or more connections for which bandwidth requests 308A are transmitted, so that the polling bandwidth allocation 310A is utilized but not exceeded. The subscriber station 306A may then transmit one or more bandwidth requests 308A to the base station 304A.

Based on the bandwidth requests 308A that are received, the base station 304A may provide one or more grants 314A of uplink bandwidth to the subscriber station 306A. The subscriber station 306A may transmit data 316A to the base station 304A in accordance with the grants 314A that are received.

Figure 4:
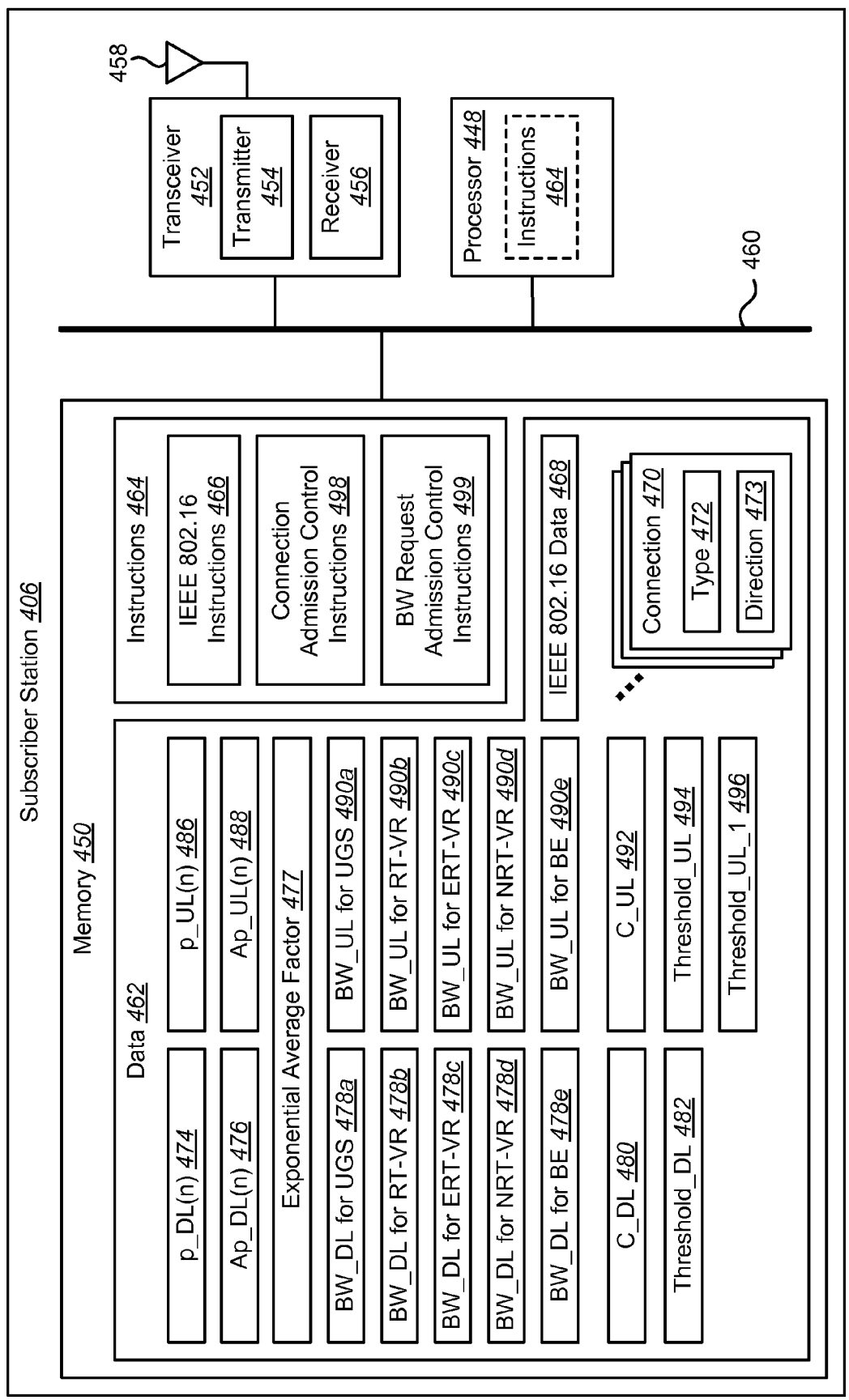
FIG. 4 illustrates an example of a subscriber station that is configured to implement admission control.

FIG. 4 illustrates an example of a subscriber station 406 that is configured to implement admission control. The subscriber station 406 includes a processor 448. The processor 448 may be a general purpose single- or multi-chip microprocessor (e.g., an ARM), a special purpose microprocessor (e.g., a digital signal processor (DSP)), a microcontroller, a programmable gate array, etc. The processor 448 may be referred to as a central processing unit (CPU). Although just a single processor 448 is shown in the subscriber station 406 of FIG. 4, in an alternative configuration, a combination of processors 448 (e.g., an ARM and DSP) could be used.

The subscriber station 406 also includes a memory 450. The memory 450 may be any electronic component capable of storing electronic information. The memory 450 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Instructions 464 and data 462 may be stored in the memory 450. The instructions 464 may be executable by the processor 448 to implement various functions, which will be described below. Executing the instructions 464 may involve the use of the data 462 that is stored in the memory 450.

The subscriber station 406 may also include a transmitter 454 and a receiver 456 to allow transmission and reception of data between the subscriber station 406 and a base station 104. The transmitter 454 and receiver 456 may be collectively referred to as a transceiver 452. An antenna 458 may be electrically coupled to the transceiver 452. The subscriber station 406 may also include (not shown) multiple transmitters 454, multiple receivers 456, multiple transceivers 452 and/or multiple antenna 458.

The various components of the subscriber station 406 may be coupled together by one or more buses, which may include a power bus, a control signal bus, a status signal bus, a data bus, etc. For the sake of clarity, the various buses are illustrated in FIG. 4 as a bus system 460.

The subscriber station 406 may be configured to communicate via a wireless communication network that supports the IEEE 802.16 standard (i.e., WiMAX). The instructions 464 stored in the memory 450 may include instructions 466 that facilitate communication in accordance with the IEEE 802.16 standard. Similarly, the data 462 stored in the memory 450 may include data 468 that facilitates communication in accordance with the IEEE 802.16 standard.

The data 462 in the memory 450 may include information about the active connections 470 that are currently maintained by the subscriber station 406. The information that is maintained about the connections 470 may include the data delivery service types 472 and direction 473 (either downlink 108 or uplink 110) of the various connections 470. The following data delivery service types 472 for transport connections are defined in the IEEE 802.16 standard: UGS (unsolicited grant service), ERT-VR (extended real-time variable rate), RT-VR (real-time variable rate), NRT-VR (non-real-time variable rate), and BE (best effort).

The unsolicited grant service is designed to support fixed-size data packets at a constant bit rate. The real-time variable rate is designed to support real-time service flows (e.g., streaming video). The non-real-time variable rate is designed to support delay-tolerant data streams that require variable-size data grants at a minimum guaranteed rate (e.g., FTP). The best-effort service is designed to support data streams that do not require a minimum service-level guarantee (e.g., web browsing). The extended real-time variable rate is designed to support real-time applications that have variable data rates but require guaranteed data rate and delay (e.g., voice over IP with silence suppression).

The data 462 in the memory 450 may include a parameter 474 that indicates the percentage of the slots 224 in the current downlink sub-frame 216 that are allocated for transmission. This parameter 474 may be referred to herein as p_DL(n) 474, where n indicates the current downlink sub-frame 216. This parameter p_DL(n) 474 may be determined by reading the DL-MAP message 332.

The data 462 in the memory 450 may also include a parameter 476 that indicates the average percentage of slots 224 per downlink sub-frame 216 that are being allocated for transmission. This parameter 476 may be referred to herein as Ap_DL(n) 476. Ap_DL(n) 476 may be determined as:

$$Ap\_DL(n) = a * p\_DL(n) + (1-a) * Ap\_DL(n-1) \quad (1)$$

The term a is an exponential average factor 477. The exponential average factor 477 may depend on the extent to which the current downlink sub-frame 216 or uplink sub-frame 218 should be weighted relative to the previous downlink sub-frame 216 or uplink sub-frame 218. The exponential average factor 477 may depend on whether subscriber station 406 is mobile or stationary, how fast subscriber station 406 is moving (if the subscriber station 406 is mobile), etc. The exponential average factor 477 may be included among the data 462 that is stored in the memory 450.

In the above example, Ap_DL(n) 476 was determined based on the percentage of slots 224 that are allocated for transmission in the current downlink sub-frames 216 (n) and the average percentage of slots of the previous downlink sub-frame 216 (n−1). However, Ap_DL(n) 476 may be determined based on the percentage of slots 224 that are allocated for transmission in more than two downlink sub-frames 216. In this case, the data 462 in the memory 450 may store additional parameters 474 that indicate the percentage of the slots 224 that are allocated for transmission in multiple previous downlink sub-frames 216 (e.g., n, n–1, n–2, n–3, . . . etc.). The general formula Ap_DL(n) 476 may be determined as:

$$Ap\_DL(n) = a0*p\_DL(n) + a1*p\_DL(n-1) + a2*p\_DL(n-2) + \quad (1a)$$
$$\ldots + b1*Ap\_DL(n-1) + b2*Ap\_DL(n-2) + \ldots$$

The data 462 in the memory 450 may also include QoS parameters 478 that indicate the downlink bandwidth demand for connections 470 of various data delivery service types 472. These bandwidth related QoS parameters 478 may be referred to as BW_DL 478. The BW_DL 478*a* for a UGS data delivery type 472 may be equal to the Maximum Sustained Traffic Rate. The BW_DL 478*b* for a RT-VR data delivery type 472 may also be equal to the Maximum Sustained Traffic Rate. The BW_DL 478*c* for an ERT-VR data delivery type 472 may also be equal to the Maximum Sustained Traffic Rate. The BW_DL 478*d* for a NRT-VR data delivery type 472 may be equal to the Minimum Reserved Traffic Rate. The BW_DL 478*e* for a BE data delivery type 472 may be equal to zero, as there is no need to reserve bandwidth.

The Maximum Sustained Traffic Rate and the Minimum Reserved Traffic Rate are QoS parameters that may be provisioned in the subscriber station 406. When a connection 470 is set up, the higher layer can indicate to the WiMAX protocol layer the attributes of the connection 470, such as the direction (either downlink 108 or uplink 110), the data delivery service type (UGS, RT-VR, ERT-VR, NRT-VR, or BE), QoS parameters, etc.

The data 462 in the memory 450 may also include a parameter 480 that indicates the downlink air-interface capacity. This parameter 480 may be referred to as C_DL 480. C_DL 480 may be pre-provisioned in the subscriber station 406.

The data 462 in the memory 450 may also include a parameter 482 that indicates a threshold value corresponding to the downlink 108 that may be used in determining whether new connections 470 should be admitted. This parameter 482 may be referred to as Threshold_DL 482. Threshold_DL 482 may be pre-provisioned in the subscriber station 406.

The data 462 in the memory 450 may also include a parameter 486 that indicates the percentage of the slots 224 in the current uplink sub-frame 218 that are allocated for transmission. This parameter 486 may be referred to herein as p_UL (n) 486, where n indicates the current uplink sub-frame 218. This parameter p_UL(n) 486 may be determined by reading the UL-MAP message 336.

The data 462 in the memory 450 may also include a parameter 488 that indicates the average percentage of slots 224 per uplink sub-frame 218 that are being allocated for transmission. This parameter 488 may be referred to herein as Ap_UL (n) 488. Ap_UL(n) 488 may be determined as:

$$Ap\_UL(n) = a*p\_UL(n) + (1-a)*Ap\_UL(n-1) \quad (2)$$

The term a is the exponential average factor 477. In the above example, Ap_UL(n) 488 was determined based on the percentage of slots 224 that are allocated for transmission in the current uplink sub-frame 218 ($n$) and the average percentage of slots of the previous uplink sub-frame 218 ($n-1$). However, Ap_UL(n) 488 may be determined based on the percentage of slots 224 that are allocated for transmission in more than two uplink sub-frames 218. In this case, the data 462 in the memory 450 may store additional parameters 488 that indicate the percentage of the slots 224 that are allocated for transmission in multiple previous uplink sub-frames 218 (e.g., n, n–1, n–2, n–3, . . . etc.). The general formula Ap_UL (n) 476 may be determined as:

$$Ap\_UL(n) = c0*p\_UL(n) + c1*p\_UL(n-1) + c2*p\_UL(n-2) + \quad (2a)$$
$$\ldots + d1*Ap\_UL(n-1) + d2*Ap\_UL(n-2) + \ldots$$

The data 462 in the memory 450 may also include parameters 490 that indicate the uplink bandwidth demand for connections 470 of various data delivery service types 472. These parameters 490 may be referred to as BW_UL 490. The BW_UL 490*a* for a UGS type 472 may be equal to the Maximum Sustained Traffic Rate. The BW_UL 490*b* for a RT-VR type 472 may also be equal to the Maximum Sustained Traffic Rate. The BW_UL 490*c* for an ERT-VR type 472 may also be equal to the Maximum Sustained Traffic Rate. The BW_UL 490*d* for a NRT-VR type 472 may be equal to the Minimum Reserved Traffic Rate. The BW_UL 490*e* for a BE type 472 may be equal to zero, as there is no need to reserve bandwidth.

The data 462 in the memory 450 may also include a parameter 492 that indicates the uplink air-interface capacity. This parameter 492 may be referred to as C_UL 492. C_UL 492 may be pre-provisioned in the subscriber station 406.

The data 462 in the memory 450 may also include a parameter 494 that indicates a threshold value corresponding to the uplink 110 that may be used in determining whether new connections 470 should be admitted. This parameter 494 may be referred to as Threshold_UL 494. Threshold_UL 494 may be pre-provisioned in the subscriber station 406.

The data 462 in the memory 450 may also include a parameter 496 that indicates a threshold value corresponding to the uplink 110 that may be used in determining whether new bandwidth requests 308A should be transmitted. This parameter 496 may be referred to as Threshold_UL_1 496. Threshold_UL_1 496 may be pre-provisioned in the subscriber station 406.

The instructions 464 in the memory 450 may include instructions 498 for performing admission control with respect to new connections 470. The instructions 464 in the memory 450 may also include instructions 499 for performing admission control with respect to bandwidth requests 308A.

Figure 5:
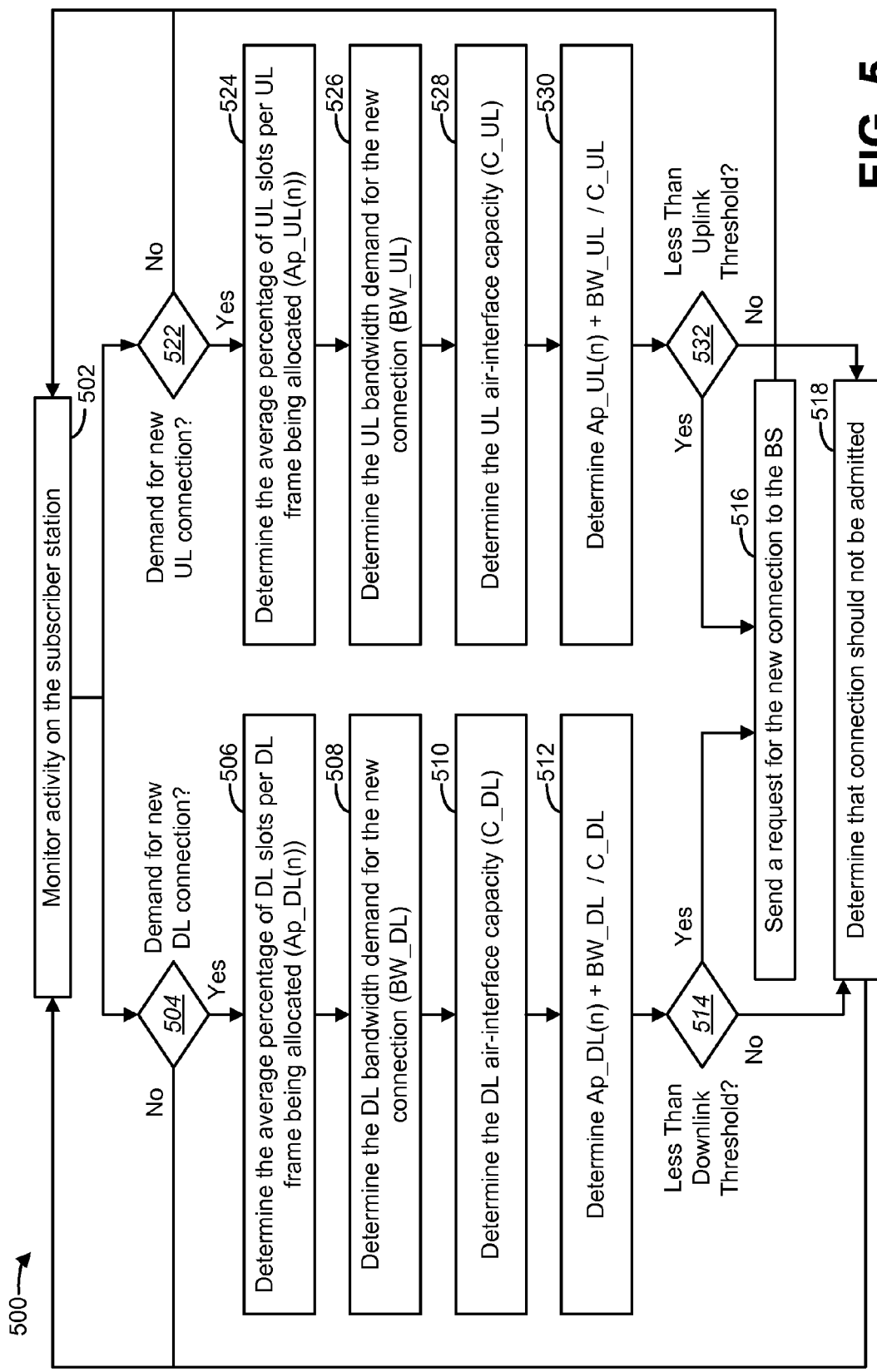
FIG. 5 illustrates an example of a method for performing admission control with respect to new connections.

FIG. 5 illustrates an example of a method 500 for performing admission control with respect to new connections 470. Subscriber station 406 may implement the depicted method 500. For example, processor 448 of subscriber station 406 may execute connection admission control instructions 498 that are stored in memory 450 of subscriber station 406 to implement the depicted method 500.

The method 500 may include monitoring 502 activity on the subscriber station 406. If it is determined 504 that there is a demand for a new downlink connection 470, the method 500 may include determining 506 the average percentage of slots 224 per downlink sub-frame 216 that are being allocated for transmission (i.e., Ap_DL(n) 476). The method 500 may also include determining 508 the downlink bandwidth demand for the new connection 470 (i.e., BW_DL 478). The method 500 may also include determining 510 the downlink air-interface capacity (i.e., C_DL 480).

The method 500 may also include determining 512 the value of the following expression:

$$Ap\_DL(n) + BW\_DL/C\_DL \quad (3)$$

The value of equation (3) may then be compared to the downlink threshold (Threshold_DL) 482. If it is determined 514 that the value of equation (3) is less than Threshold_DL 482, then the new connection 470 should be admitted and a request may be sent 516 to the base station 104 to set up this new connection. However, if it is determined 514 that the value of equation (3) is not less than Threshold_DL 482, then it may be determined 518 that the new connection 470 should not be admitted.

Method 500 may include determining 522 that there is a demand for a new uplink connection 470. If it is determined 522 that there is a demand for a new uplink connection 470, method 500 may include determining 524 the average percentage of slots 224 per uplink sub-frame 218 that are being allocated for transmission (i.e., Ap_UL(n) 488). Method 500 may also include determining 526 the uplink bandwidth demand for the new connection 470 (i.e., BW_UL 490). The method 500 may also include determining 528 the uplink air-interface capacity (i.e., C_UL 492).

The method 500 may also include determining 530 the value of the following expression:

$$Ap\_UL(n)+BW\_UL/C\_UL \quad (4)$$

The value of equation (4) may then be compared to the uplink threshold (Threshold_UL) 494. If it is determined 532 that the value of equation (4) is less than Threshold_UL 494, then the new connection 470 should be admitted and a request may be sent 516 to the base station 104 to set up this new connection. However, if it is determined 532 that the value of equation (4) is not less than Threshold_UL 494, then it may be determined 518 that the new connection 470 should not be admitted.

Thus, FIG. 5 illustrates an example of how a subscriber station 406 may determine whether a new connection 470 should be admitted based on resource availability. In this context, the term resource availability refers to the extent to which the resources of a wireless communication network 100 are being utilized, e.g., the level of congestion of the wireless communication network 100.

Figure 5A:
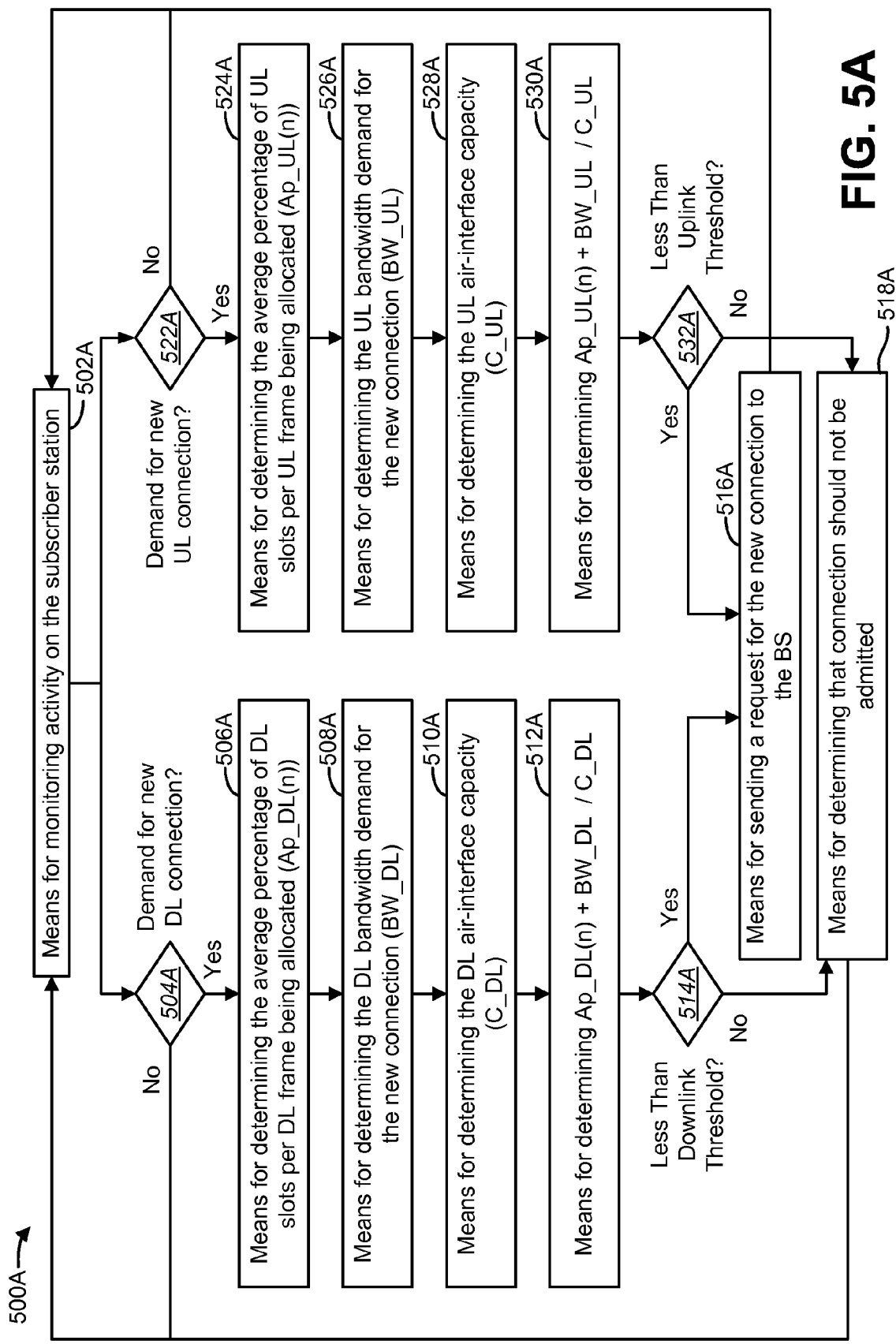
FIG. 5A illustrates means-plus-function blocks corresponding to the method of FIG. 5.

The method 500 of FIG. 5 described above may be performed by various hardware and/or software component(s) and/or module(s) corresponding to the means-plus-function blocks 500A illustrated in FIG. 5A. In other words, blocks 502 through 532 illustrated in FIG. 5 correspond to means-plus-function blocks 502A through 532A illustrated in FIG. 5A.

Figure 6:
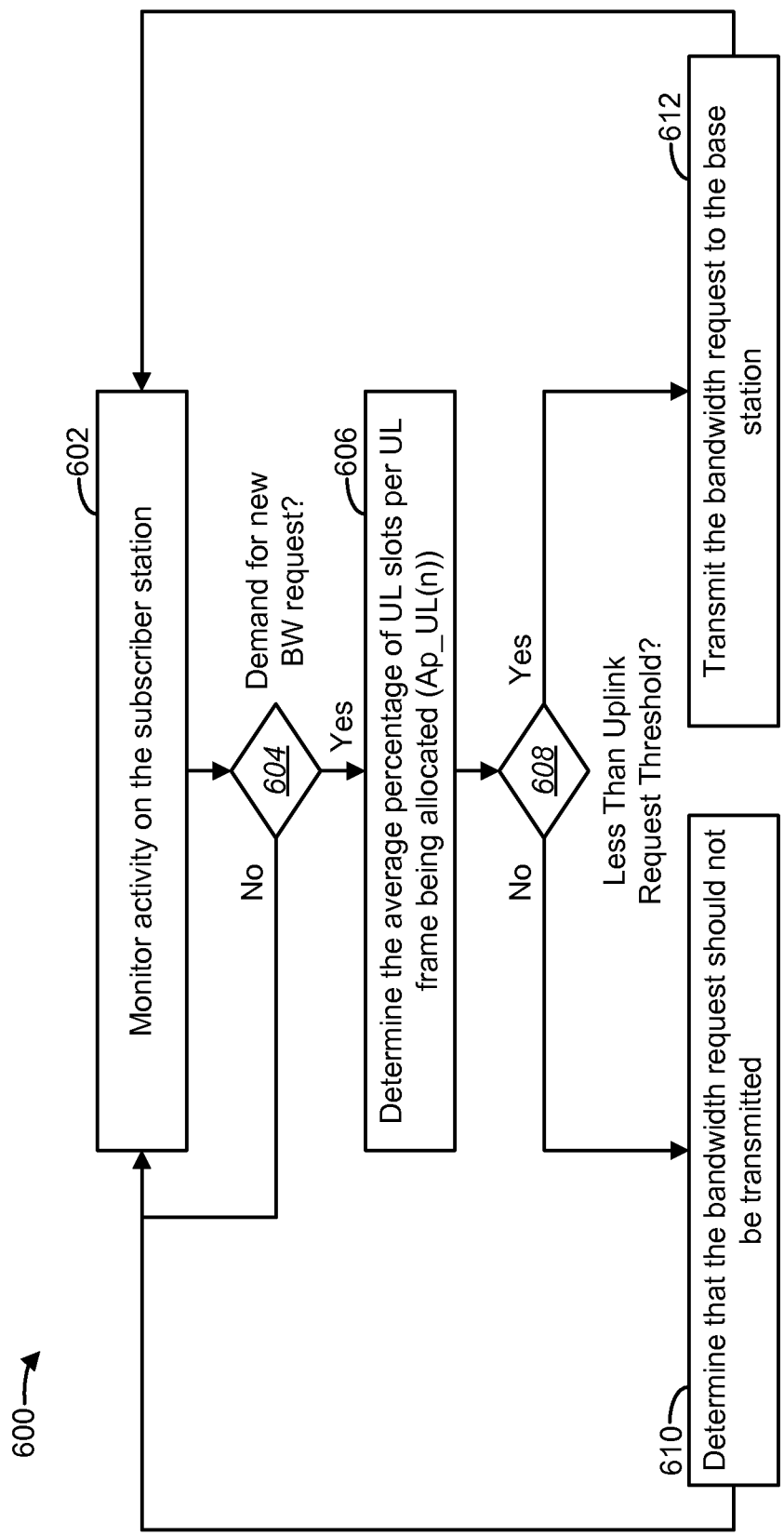
FIG. 6 illustrates a method for performing admission control with respect to new bandwidth requests.

FIG. 6 illustrates a method 600 for performing admission control with respect to new bandwidth requests 308A. The subscriber station 406 may implement the depicted method 600. For example, the processor 448 of the subscriber station 406 may execute the bandwidth request admission control instructions 499 that are stored in the memory 450 of the subscriber station 406 to implement the depicted method 600.

The method 600 may include monitoring 602 activity on the subscriber station 406. If it is determined 604 that there is a demand for a new bandwidth request 308A, the method 600 may include determining 606 the average percentage of slots 224 per uplink sub-frame 218 that are being allocated for transmission (i.e., Ap_UL(n) 488). The value of Ap_UL(n) 488 may then be compared to the bandwidth request threshold (i.e., Threshold_UL_1 496). If it is determined 608 that Ap_UL(n) 488 is greater than Threshold_UL_1 496, then it may be determined 610 that the bandwidth request 308A should not be transmitted. However, if it is determined 608 that Ap_UL(n) 488 is less than Threshold_UL_1 496, then it may be determined that the bandwidth request 308A should be transmitted, and the bandwidth request 308A may be transmitted 612 to the base station 104.

Figure 6A:
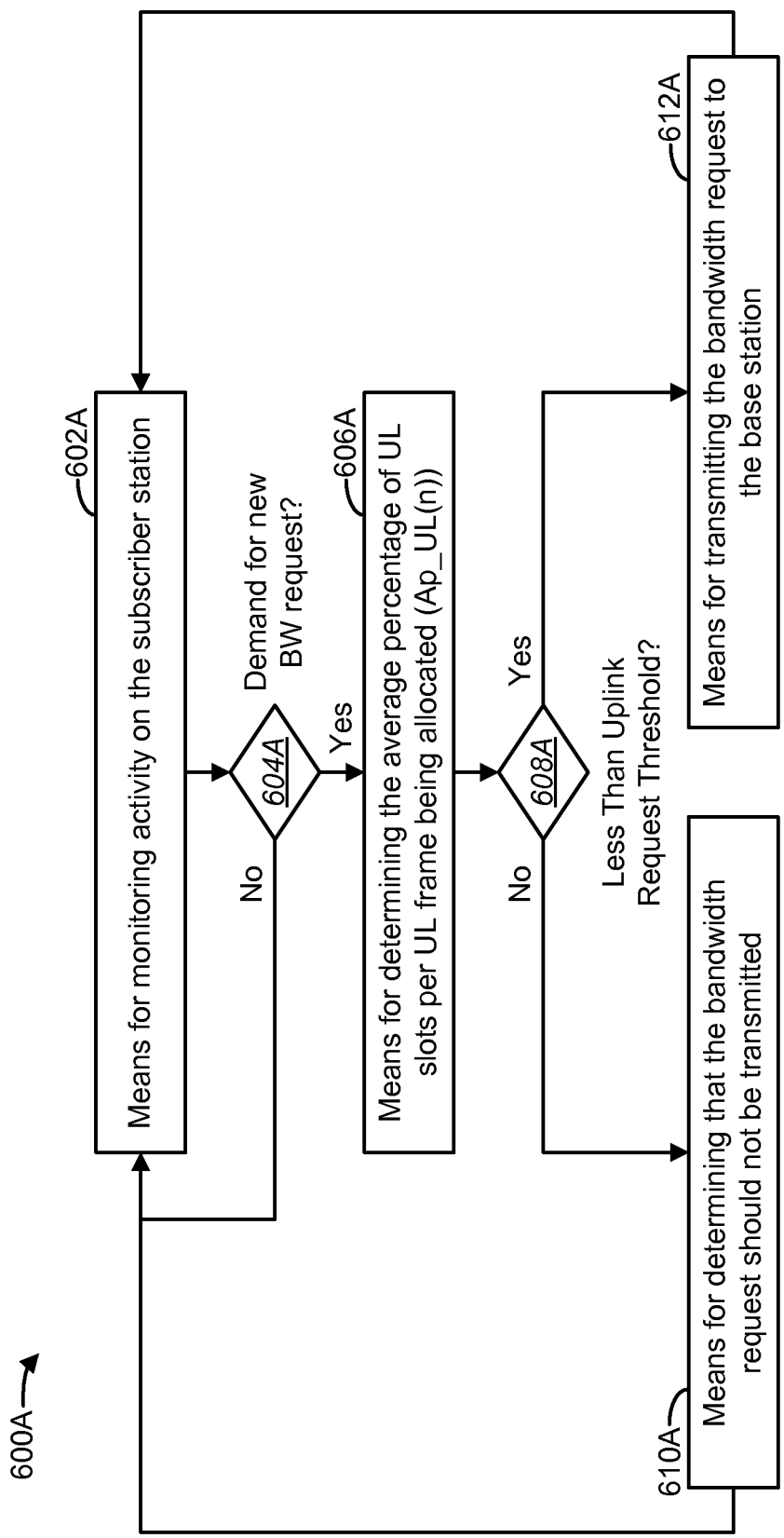
FIG. 6A illustrates means-plus-function blocks corresponding to the method of FIG. 6.

Thus, FIG. 6 illustrates an example of how a subscriber station 406 may determine whether a bandwidth request 308A should be admitted based on resource availability. As indicated above, the term resource availability refers to the extent to which the resources of a wireless communication network 100 are being utilized, e.g., the level of congestion of the wireless communication network 100. The method 600 of FIG. 6 described above may be performed by various hardware and/or software component(s) and/or module(s) corresponding to the means-plus-function blocks 600A illustrated in FIG. 6A. In other words, blocks 602 through 612 illustrated in FIG. 6 correspond to means-plus-function blocks 602A through 612A illustrated in FIG. 6A.

FIG. 7 illustrates an alternative method 700 for performing admission control with respect to new connections 470. Subscriber station 406 may implement the depicted method 700. For example, processor 448 of subscriber station 406 may execute connection admission control instructions 498 that are stored in memory 450 of subscriber station 406 to implement the depicted method 700.

The method 700 may include monitoring 702 activity on the subscriber station 406. If it is determined 704 that there is a demand for a new downlink connection 470, the method 700 may include determining 706 the percentage of slots 224 in the current downlink sub-frame 216 that are allocated for transmission (i.e., p_DL(n) 474). The method 700 may also include determining 708 the downlink bandwidth demand for the new connection 470 (i.e., BW_DL 478). The method 700 may also include determining 710 the downlink air-interface capacity (i.e., C_DL 480).

The method 700 may also include determining 712 the value of the following expression:

$$p\_DL(n)+BW\_DL/C\_DL \quad (5)$$

The value of equation (5) may then be compared to the downlink threshold (Threshold_DL) 482. If it is determined 714 that the value of equation (5) is less than Threshold_DL 482, then the new connection 470 should be admitted and a request may be sent 716 to the base station 104 to set up this new connection 716. However, if it is determined 714 that the value of equation (5) is not less than Threshold_DL 482, then it may be determined 718 that the new connection 470 should not be admitted 718.

The method 700 may include determining 722 that there is a demand for a new uplink connection 470. If it is determined 722 that there is a demand for a new uplink connection 470, the method 500 may include determining 724 the percentage of slots 224 in the current uplink sub-frame 218 that are allocated for transmission (i.e., p_UL(n) 486). The method 700 may also include determining 720 the uplink bandwidth demand for the new connection 470 (i.e., BW_UL 490). The method 700 may also include determining 728 the uplink air-interface capacity (i.e., C_UL 492).

The method 700 may also include determining 730 the value of the following expression:

$$p\_UL(n)+BW\_UL/C\_UL \quad (6)$$

The value of equation (6) may then be compared to the uplink threshold (Threshold_UL) 494. If it is determined 732 that the value of equation (6) is less than Threshold_UL 494, the new connection 470 should be admitted and a request may be sent 716 to the base station 104 to set up this new connection. However, if it is determined 732 that the value of equation (6) is not less than Threshold_UL 494, then it may be determined 718 that the new connection 470 should not be admitted.

Thus, FIG. 7 illustrates another example of how a subscriber station 406 may determine whether a new connection 470 should be admitted based on resource availability. As indicated above, the term resource availability refers to the extent to which the resources of a wireless communication network 100 are being utilized, e.g., the level of congestion of the wireless communication network 100. The method 700 of FIG. 7 described above may be performed by various hardware and/or software component(s) and/or module(s) corresponding to the means-plus-function blocks 700A illustrated in FIG. 7A. In other words, blocks 702 through 732 illustrated in FIG. 7 correspond to means-plus-function blocks 702A through 732A illustrated in FIG. 7A.

Figure 8:
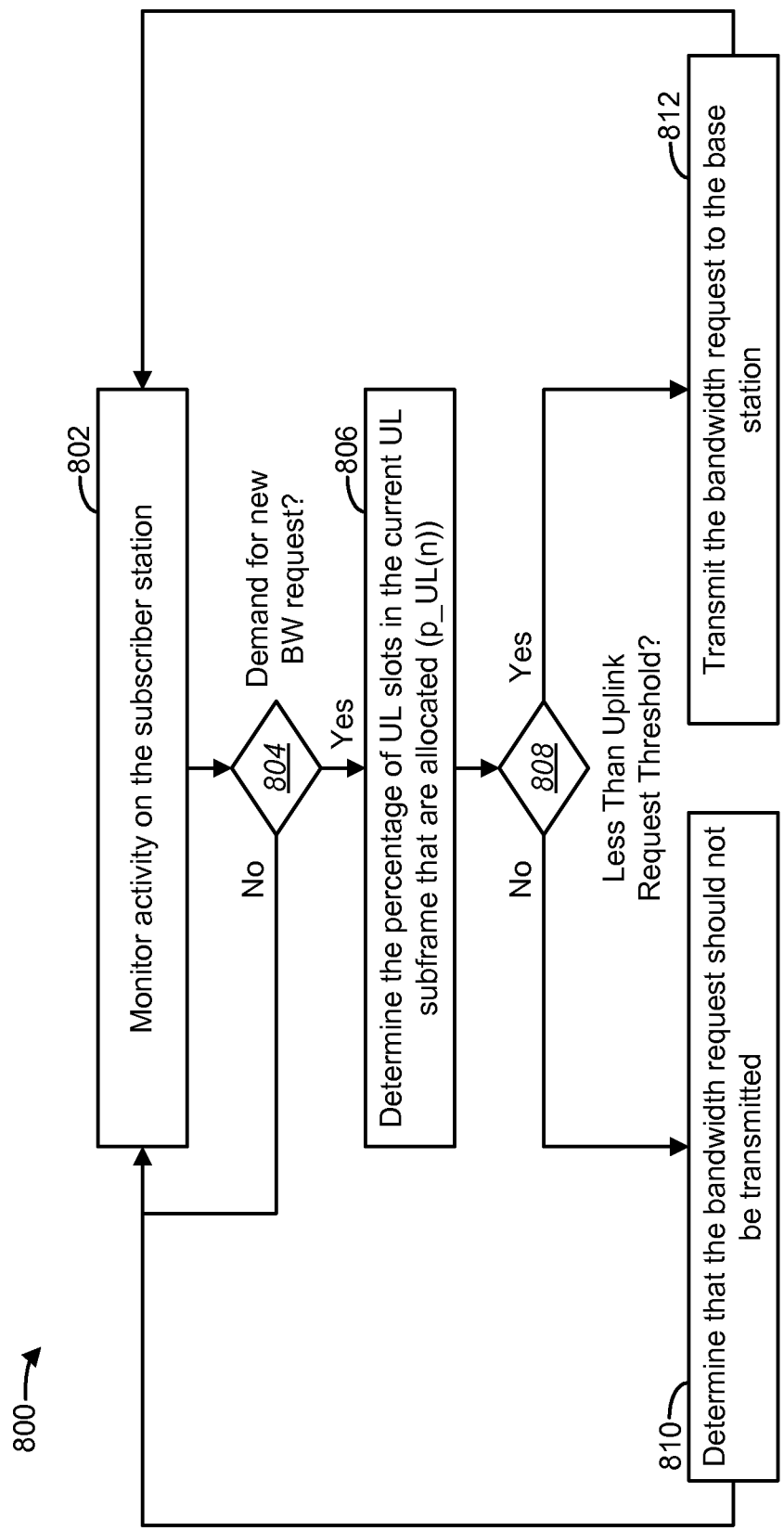
FIG. 8 illustrates an alternative method for performing admission control with respect to new bandwidth requests.

FIG. 8 illustrates an alternative method 800 for performing admission control with respect to new bandwidth requests 308A. Subscriber station 406 may implement the depicted method 800. For example, processor 448 of subscriber station 406 may execute bandwidth request admission control instructions 499 that are stored in memory 450 of subscriber station 406 to implement the depicted method 800.

The method 800 may include monitoring 802 activity on the subscriber station 406. If it is determined 804 that there is a demand for a new bandwidth request 308A, the method 800 may include determining 806 the percentage of slots 224 in the current uplink sub-frame 218 that are allocated for transmission (i.e., $p\_UL(n)$ 486). The value of $p\_UL(n)$ 486 may then be compared to the bandwidth request threshold (i.e., $Threshold\_UL\_1$ 496). If it is determined 808 that $p\_UL(n)$ 486 is greater than $Threshold\_UL\_1$ 496, then it may be determined 810 that the bandwidth request 308A should not be transmitted. However, if it is determined 808 that $p\_UL(n)$ 486 is less than $Threshold\_UL\_1$ 496, then it may be determined that the bandwidth request 308A should be transmitted, and the bandwidth request 308A may be transmitted 812 to the base station 104.

Figure 8A:
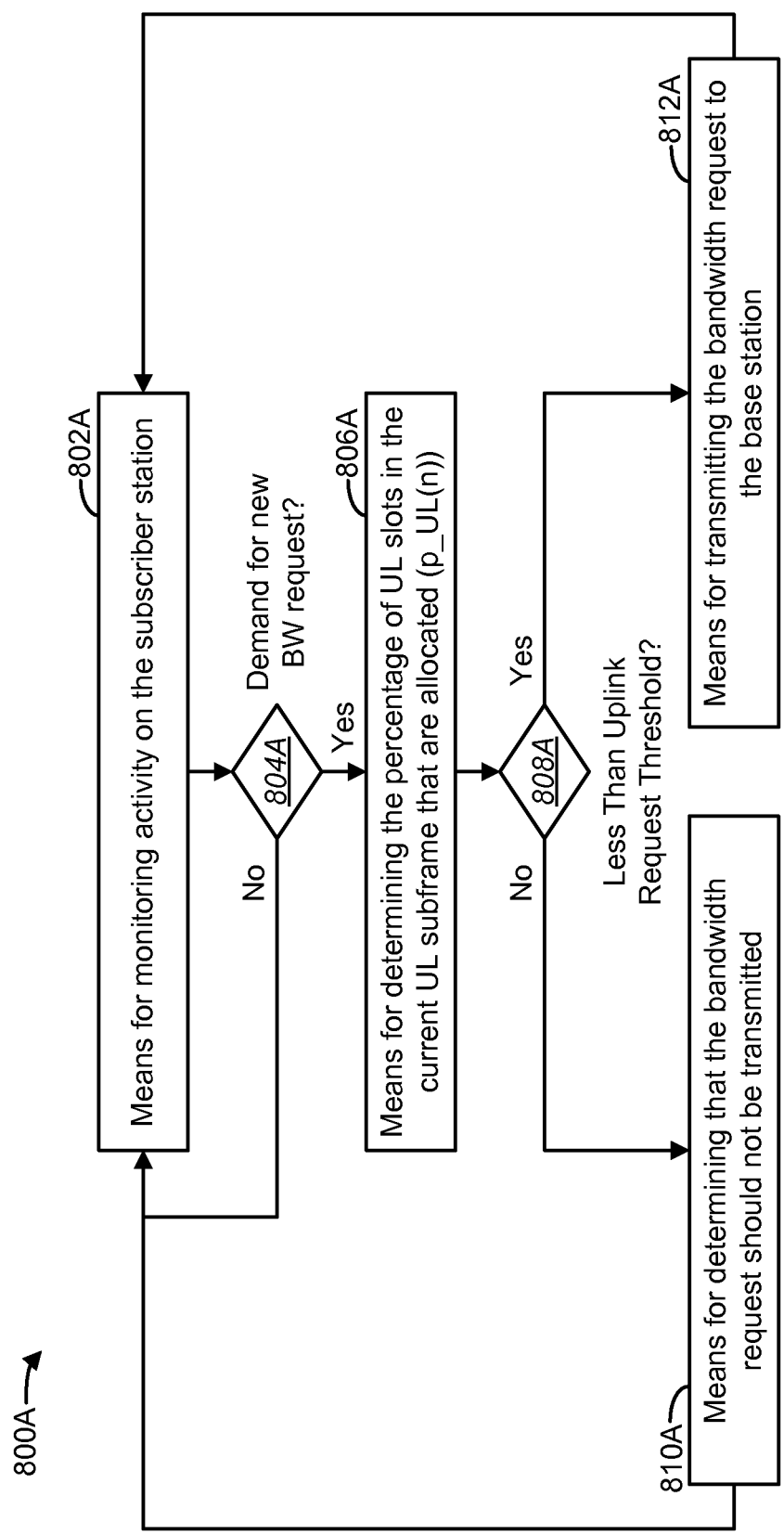
FIG. 8A illustrates means-plus-function blocks corresponding to the method of FIG. 8.

Thus, FIG. 8 illustrates another example of how a subscriber station 406 may determine whether a bandwidth request 308A should be admitted based on resource availability. As indicated above, the term resource availability refers to the extent to which the resources of a wireless communication network 100 are being utilized, e.g., the level of congestion of the wireless communication network 100. The method 800 of FIG. 8 described above may be performed by various hardware and/or software component(s) and/or module(s) corresponding to the means-plus-function blocks 800A illustrated in FIG. 8A. In other words, blocks 802 through 812 illustrated in FIG. 8 correspond to means-plus-function blocks 802A through 812A illustrated in FIG. 8A.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. "Determining" can include resolving, selecting, choosing, establishing and the like.

The phrase "based on" does not mean "based only on," unless expressly specified otherwise. In other words, the phrase "based on" describes both "based only on" and "based at least on." As used herein, the terms "code" and "instructions" should be interpreted broadly to include any type of computer-readable statement(s). For example, the terms "code" and "instructions" may refer to one or more programs, routines, sub-routines, functions, procedures, etc.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions or code, or as one or more sets of instructions or code on a computer-readable medium, storage medium or computer-program product. A computer-readable medium may be any available medium that can be accessed by a computer or one or more processing devices. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 5, 6, 7 and 8, can be downloaded and/or otherwise obtained by a subscriber station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a subscriber station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for subscriber station-based admission control, the method being implemented by a subscriber station, the method comprising:
   determining, by the subscriber station, that there is demand for a new connection at the subscriber station;
   determining, by the subscriber station, whether the new connection should be admitted based on resource availability, wherein the resource availability is a function of an average percentage or a percentage of slots per sub-frame that are being allocated for transmission, a bandwidth demand for the new connection, a link air-interface capacity, and a link threshold; and
   sending, by the subscriber station, a request for the new connection in response to determining that the new connection should be admitted based on the resource availability.

2. The method of claim 1, wherein determining whether the new connection should be admitted comprises at least one of:
   determining an average percentage of slots per downlink sub-frame that are being allocated for transmission; and
   determining an average percentage of slots per uplink frame that are being allocated for transmission.

3. The method of claim 1, wherein the new connection is a downlink connection, and wherein it is determined that a new downlink connection should be admitted if $Ap\_DL(n)+BW\_DL/C\_DL<Threshold\_DL$:
   wherein $Ap\_DL(n)$ indicates an average percentage of slots per downlink sub-frame that are being allocated for transmission;
   wherein BW DL indicates downlink bandwidth demand for the new downlink connection;
   wherein $C\_DL$ indicates downlink air-interface capacity; and
   wherein Threshold DL indicates a downlink threshold.

4. The method of claim 1, wherein the new connection is an uplink connection, and wherein it is determined that a new uplink connection should be admitted if $Ap\_UL(n)+BW\_UL/C\_UL<Threshold\_UL$:
   wherein $Ap\_UL(n)$ indicates an average percentage of slots per uplink sub-frame that are being allocated for transmission;
   wherein BW UL indicates uplink bandwidth demand for the new uplink connection;
   wherein $C\_UL$ indicates uplink air-interface capacity; and
   wherein Threshold_UL indicates an uplink threshold.

5. The method of claim 1, wherein determining whether the new connection should be admitted comprises at least one of:
   determining a percentage of slots in a current downlink sub-frame that are allocated for transmission; and
   determining a percentage of slots in a current uplink sub-frame that are allocated for transmission.

6. The method of claim 1, wherein the new connection is a downlink connection, and wherein it is determined that a new downlink connection should be admitted if $p\_DL(n)+BW\_DL/C\_DL<Threshold\_DL$:
   wherein $p\_DL(n)$ indicates a percentage of slots in a current downlink sub-frame that are allocated for transmission;
   wherein BW DL indicates downlink bandwidth demand for the new downlink connection;
   wherein $C\_DL$ indicates downlink air-interface capacity; and
   wherein Threshold DL indicates a downlink threshold.

7. The method of claim 1, wherein the new connection is an uplink connection, and wherein it is determined that a new uplink connection should be admitted if $p\_UL(n)+BW\_UL/C\_UL<Threshold\_UL$:
   wherein $p\_UL(n)$ indicates a percentage of slots in a current uplink sub-frame that are allocated for transmission;
   wherein BW UL indicates uplink bandwidth demand for the new uplink connection;
   wherein $C\_UL$ indicates uplink air-interface capacity; and
   wherein Threshold_UL indicates an uplink threshold.

8. The method of claim 1, further comprising:
   determining that there is demand for a bandwidth request to be transmitted by the subscriber station;
   determining whether the bandwidth request should be transmitted based on resource availability; and
   sending the bandwidth request if it is determined that the bandwidth request should be transmitted.

9. The method of claim 8, wherein it is determined that the bandwidth request should be transmitted if $Ap\_UL(n)<Threshold\_UL\_1$, wherein $Ap\_DL(n)$ indicates an average percentage of slots per downlink sub-frame that are being allocated for transmission, and wherein Threshold_UL_1 indicates a bandwidth request threshold.

10. The method of claim 8, wherein it is determined that the bandwidth request should be transmitted if $p\_UL(n)<Threshold\_UL\_1$, wherein $p\_UL(n)$ indicates a percentage of slots in a current uplink sub-frame that are allocated for transmission, and wherein Threshold_UL_1 indicates a bandwidth request threshold.

11. A subscriber station that is configured to implement admission control, comprising:
   a processor;
   memory in electronic communication with the processor;
   instructions stored in the memory, the instructions being executable by the processor to:
   determine that there is demand for a new connection at the subscriber station;
   determine whether the new connection should be admitted based on resource availability, wherein the resource availability is a function of an average percentage or a percentage of slots per sub-frame that are being allocated for transmission, a bandwidth demand for the new connection, a link air-interface capacity, and a link threshold; and
   send a request for the new connection in response to determining that the new connection should be admitted based on the resource availability.

12. The subscriber station of claim 11, wherein determining whether the new connection should be admitted comprises at least one of:

determining an average percentage of slots per downlink sub-frame that are being allocated for transmission; and
determining an average percentage of slots per uplink frame that are being allocated for transmission.

13. The subscriber station of claim 11, wherein the new connection is a downlink connection, and wherein it is determined that a new downlink connection should be admitted if $Ap\_DL(n)+BW\_DLC\_DL<Threshold\_DL$:
   wherein $Ap\_DL(n)$ indicates an average percentage of slots per downlink sub-frame that are being allocated for transmission;
   wherein BW DL indicates downlink bandwidth demand for the new downlink connection;
   wherein $C\_DL$ indicates downlink air-interface capacity; and
   wherein Threshold DL indicates a downlink threshold.

14. The subscriber station of claim 11, wherein the new connection is an uplink connection, and wherein it is determined that a new uplink connection should be admitted if $Ap\_UL(n)+BW\_UL/C\_UL<Threshold\_UL$:
   wherein $Ap\_UL(n)$ indicates an average percentage of slots per uplink sub-frame that are being allocated for transmission;
   wherein BW UL indicates uplink bandwidth demand for the new uplink connection;
   wherein $C\_UL$ indicates uplink air-interface capacity; and
   wherein Threshold_UL indicates an uplink threshold.

15. The subscriber station of claim 11, wherein determining whether the new connection should be admitted comprises at least one of:
   determining a percentage of slots in a current downlink sub-frame that are allocated for transmission; and
   determining a percentage of slots in a current uplink sub-frame that are allocated for transmission.

16. The subscriber station of claim 11, wherein the new connection is a downlink connection, and wherein it is determined that a new downlink connection should be admitted if $p\_DL(n)+BW\_DL/C\_DL<Threshold\_DL$:
   wherein $p\_DL(n)$ indicates a percentage of slots in a current downlink sub-frame that are allocated for transmission;
   wherein BW DL indicates downlink bandwidth demand for the new downlink connection;
   wherein $C\_DL$ indicates downlink air-interface capacity; and
   wherein Threshold DL indicates a downlink threshold.

17. The subscriber station of claim 11, wherein the new connection is an uplink connection, and wherein it is determined that a new uplink connection should be admitted if $p\_UL(n)+BW\_UL/C\_UL<Threshold\_UL$:
   wherein $p\_UL(n)$ indicates a percentage of slots in a current uplink sub-frame that are allocated for transmission;
   wherein BW UL indicates uplink bandwidth demand for the new uplink connection;
   wherein $C\_UL$ indicates uplink air-interface capacity; and
   wherein Threshold_UL indicates an uplink threshold.

18. The subscriber station of claim 11, wherein the instructions are also executable by the processor to:
   determine that there is demand for a bandwidth request to be transmitted by the subscriber station;
   determine whether the bandwidth request should be transmitted based on resource availability; and
   send the bandwidth request if it is determined that the bandwidth request should be transmitted.

19. The subscriber station of claim 18, wherein it is determined that the bandwidth request should be transmitted if $Ap\_UL(n)<Threshold\_UL\_1$, wherein $Ap\_DL(n)$ indicates an average percentage of slots per downlink sub-frame that are being allocated for transmission, and wherein Threshold_UL_1 indicates a bandwidth request threshold.

20. The subscriber station of claim 18, wherein it is determined that the bandwidth request should be transmitted if $p\_UL(n)<Threshold\_UL\_1$, wherein $p\_UL(n)$ indicates a percentage of slots in a current uplink sub-frame that are allocated for transmission, and wherein Threshold_UL_1 indicates a bandwidth request threshold.

21. A subscriber station that is configured to implement admission control, comprising:
   means for determining that there is demand for a new connection at the subscriber station;
   means for determining whether the new connection should be admitted based on resource availability, wherein the resource availability is a function of an average percentage or a percentage of slots per sub-frame that are being allocated for transmission, a bandwidth demand for the new connection, a link air-interface capacity, and a link threshold; and
   means for sending a request for the new connection in response to determining that the new connection should be admitted based on the resource availability.

22. The subscriber station of claim 21, wherein the means for determining whether the new connection should be admitted comprises at least one of:
   means for determining an average percentage of slots per downlink sub-frame that are being allocated for transmission; and
   means for determining an average percentage of slots per uplink frame that are being allocated for transmission.

23. The subscriber station of claim 21, wherein the new connection is a downlink connection, and wherein it is determined that a new downlink connection should be admitted if $Ap\_DL(n)+BW\ DL/C\_DL<Threshold\_DL$:
   wherein $Ap\_DL(n)$ indicates an average percentage of slots per downlink sub-frame that are being allocated for transmission;
   wherein BW DL indicates downlink bandwidth demand for the new downlink connection;
   wherein $C\_DL$ indicates downlink air-interface capacity; and
   wherein Threshold DL indicates a downlink threshold.

24. The subscriber station of claim 21, wherein the new connection is an uplink connection, and wherein it is determined that a new uplink connection should be admitted if $Ap\_UL(n)+BW\_UL/C\_UL<Threshold\_UL$:
   wherein $Ap\_UL(n)$ indicates an average percentage of slots per uplink sub-frame that are being allocated for transmission;
   wherein BW UL indicates uplink bandwidth demand for the new uplink connection;
   wherein $C\_UL$ indicates uplink air-interface capacity; and
   wherein Threshold_UL indicates an uplink threshold.

25. The subscriber station of claim 21, wherein the means for determining whether the new connection should be admitted comprises at least one of:
   means for determining a percentage of slots in a current downlink sub-frame that are allocated for transmission; and
   means for determining a percentage of slots in a current uplink sub-frame that are allocated for transmission.

26. The subscriber station of claim 21, wherein the new connection is a downlink connection, and wherein it is determined that a new downlink connection should be admitted if $p\_DL(n)+BW\ DL/C\_DL<Threshold\_DL$:

wherein p_DL(n) indicates a percentage of slots in a current downlink sub-frame that are allocated for transmission;

wherein BW DL indicates downlink bandwidth demand for the new downlink connection;

wherein C_DL indicates downlink air-interface capacity; and wherein Threshold DL indicates a downlink threshold.

27. The subscriber station of claim 21, wherein the new connection is an uplink connection, and wherein it is determined that a new uplink connection should be admitted if p_UL(n)+BW_UL/C_UL<Threshold_UL:

wherein p_UL(n) indicates a percentage of slots in a current uplink sub-frame that are allocated for transmission;

wherein BW UL indicates uplink bandwidth demand for the new uplink connection;

wherein C_UL indicates uplink air-interface capacity; and wherein Threshold_UL indicates an uplink threshold.

28. The subscriber station of claim 21, further comprising:

means for determining that there is demand for a bandwidth request to be transmitted by the subscriber station;

means for determining whether the bandwidth request should be transmitted based on resource availability; and means for sending the bandwidth request if it is determined that the bandwidth request should be transmitted.

29. The subscriber station of claim 28, wherein it is determined that the bandwidth request should be transmitted if Ap_UL(n)<Threshold_UL_1, wherein Ap_DL(n) indicates an average percentage of slots per downlink sub-frame that are being allocated for transmission, and wherein Threshold_UL_1 indicates a bandwidth request threshold.

30. The subscriber station of claim 28, wherein it is determined that the bandwidth request should be transmitted if p_UL(n)<Threshold_UL_1 wherein p_UL(n) indicates a percentage of slots in a current uplink sub-frame that are allocated for transmission, and wherein Threshold_UL_1 indicates a bandwidth request threshold.

31. A computer-program product for implementing subscriber station-based admission control, the computer-program product comprising a non-transitory computer-readable medium having instructions thereon, the instructions comprising:

code for determining, by the subscriber station, that there is demand for a new connection at the subscriber station;

code for determining, by the subscriber station, whether the new connection should be admitted based on resource availability, wherein the resource availability is a function of an average percentage or a percentage of slots per sub-frame that are being allocated for transmission, a bandwidth demand for the new connection, a link air-interface capacity, and a link threshold; and code for sending, by the subscriber station, a request for the new connection on a polling bandwidth in response to determining that the new connection should be admitted based on the resource availability.

32. The computer-program product of claim 31, wherein the code for determining whether the new connection should be admitted comprises at least one of:

code for determining an average percentage of slots per downlink sub-frame that are being allocated for transmission; and code for determining an average percentage of slots per uplink frame that are being allocated for transmission.

33. The computer-program product of claim 31, wherein the new connection is a downlink connection, and wherein it is determined that a new downlink connection should be admitted if Ap_DL(n)+BW_DL/C_DL<Threshold_DL:

wherein Ap_DL(n) indicates an average percentage of slots per downlink sub-frame that are being allocated for transmission;

wherein BW DL indicates downlink bandwidth demand for the new downlink connection; wherein C_DL indicates downlink air-interface capacity; and wherein Threshold DL indicates a downlink threshold.

34. The computer-program product of claim 31, wherein the new connection is an uplink connection, and wherein it is determined that a new uplink connection should be admitted if Ap_UL(n)+BW_UL/C_UL<Threshold_UL: wherein Ap_UL(n) indicates an average percentage of slots per uplink sub-frame that are being allocated for transmission;

wherein BW UL indicates uplink bandwidth demand for the new uplink connection;

wherein C_UL indicates uplink air-interface capacity; and wherein Threshold_UL indicates an uplink threshold.

35. The computer-program product of claim 31, wherein the code for determining whether the new connection should be admitted comprises at least one of:

code for determining a percentage of slots in a current downlink sub-frame that are allocated for transmission; and code for determining a percentage of slots in a current uplink sub-frame that are allocated for transmission.

36. The computer-program product of claim 31, wherein the new connection is a downlink connection, and wherein it is determined that a new downlink connection should be admitted if p_DL(n)+BW_DL/C_DL<Threshold_DL:

wherein p_DL(n) indicates a percentage of slots in a current downlink sub-frame that are allocated for transmission;

wherein BW DL indicates downlink bandwidth demand for the new downlink connection;

wherein C_DL indicates downlink air-interface capacity; and wherein Threshold DL indicates a downlink threshold.

37. The computer-program product of claim 31, wherein the new connection is an uplink connection, and wherein it is determined that a new uplink connection should be admitted if p_UL(n)+BW_UL/C_UL<Threshold_UL:

wherein p_UL(n) indicates a percentage of slots in a current uplink sub-frame that are allocated for transmission;

wherein BW UL indicates uplink bandwidth demand for the new uplink connection;

wherein C_UL indicates uplink air-interface capacity; and wherein Threshold_UL indicates an uplink threshold.

38. The computer-program product of claim 31, further comprising:

code for determining that there is demand for a bandwidth request to be transmitted by the subscriber station;

code for determining whether the bandwidth request should be transmitted based on resource availability; and code for sending the bandwidth request if it is determined that the bandwidth request should be transmitted.

39. The computer-program product of claim 38, wherein it is determined that the bandwidth request should be transmitted if Ap_UL(n)<Threshold_UL_1, wherein Ap_DL(n) indicates an average percentage of slots per downlink sub-frame that are being allocated for transmission, and wherein Threshold_UL_1 indicates a bandwidth request threshold.

40. The computer-program product of claim 38, wherein it is determined that the bandwidth request should be transmitted if p_UL(n)<Threshold_UL_1, wherein p_UL(n) indicates a percentage of slots in a current uplink sub-frame that are allocated for transmission, and wherein Threshold_UL_1 indicates a bandwidth request threshold.

41. The method of claim 1, wherein sending the request for the new connection further comprises sending the request for the new connection on a polling bandwidth communicated by a base station.

42. The subscriber station of claim 11, wherein the instructions are further executable by the processor to send the request for the new connection on a polling bandwidth communicated by a base station.

43. The subscriber station of claim 21, wherein the means for sending the request for the new connection further comprises means for sending the request for the new connection on a polling bandwidth communicated by a base station.

44. The computer-program product of claim 31, wherein the code for sending the request for the new connection further comprises code for sending the request for the new connection on a polling bandwidth communicated by a base station.

* * * * *